United States Patent
Dizengof

(10) Patent No.: US 11,139,996 B2
(45) Date of Patent: *Oct. 5, 2021

(54) METHOD FOR STREAMING REAL-TIME DATA FROM A USER DEVICE TO A DISPATCH UNIT TERMINAL

(71) Applicant: Carbyne Ltd., Tel-Aviv (IL)

(72) Inventor: Alexander Dizengof, Ashdod (IL)

(73) Assignee: Carbyne Ltd., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,074

(22) Filed: Jun. 15, 2020

(65) Prior Publication Data

US 2020/0313922 A1 Oct. 1, 2020

Related U.S. Application Data

(63) Continuation of application No. 15/822,927, filed on Nov. 27, 2017, now Pat. No. 10,686,618.

(Continued)

(51) Int. Cl.
*H04M 3/51* (2006.01)
*H04M 3/42* (2006.01)
*H04L 12/18* (2006.01)
*H04L 12/24* (2006.01)
*H04L 29/08* (2006.01)
(Continued)

(52) U.S. Cl.
CPC ...... *H04L 12/1895* (2013.01); *H04L 41/0654* (2013.01); *H04L 65/1046* (2013.01); *H04L 65/1053* (2013.01); *H04L 65/1069* (2013.01); *H04L 65/1096* (2013.01); *H04L 67/146* (2013.01); *H04M 1/72418* (2021.01); *H04M 3/5116* (2013.01); *H04W 4/90* (2018.02); *H04M 2242/15* (2013.01); *H04W 4/027* (2013.01); *H04W 4/14* (2013.01); *H04W 76/19* (2018.02)

(58) Field of Classification Search
None
See application file for complete search history.

(56) References Cited

U.S. PATENT DOCUMENTS 8,504,090 B2   8/2013   Klein et al.
9,414,225 B2 * 8/2016   Timariu ............... H04L 67/02
(Continued)

FOREIGN PATENT DOCUMENTS

EP   2992692   3/2016

OTHER PUBLICATIONS

Advisory Action Before the Filing of an Appeal Brief dated Feb. 6, 2019 From the US Patent and Trademark Office Re. U.S. Appl. No. 15/822,927. (4 pages).

(Continued)

*Primary Examiner* — Gary Lafontant

(57) ABSTRACT

A system and method for streaming real-time data from a user device to a dispatch unit terminal, where the method includes: identifying a connection between a user device and a call center; sending a link to the user device, wherein the link includes instructions to initiate streaming of real-time data from the user device, and further includes a unique identifier associated with the user device; and sending the real-time data to a dispatch unit terminal, where the unique identifier is used to match the real-time data with the dispatch terminal used in the first connection.

21 Claims, 3 Drawing Sheets

Related U.S. Application Data

(60) Provisional application No. 62/544,835, filed on Aug. 13, 2017.

(51) Int. Cl.
| | | |
|---|---|---|
| *H04L 29/06* | (2006.01) | |
| *H04W 4/90* | (2018.01) | |
| *H04M 1/72418* | (2021.01) | |
| *H04W 4/14* | (2009.01) | |
| *H04W 76/19* | (2018.01) | |
| *H04W 4/02* | (2018.01) | |

(56) References Cited

U.S. PATENT DOCUMENTS

| | | | |
|---|---|---|---|
| 9,792,654 | B1 | 10/2017 | Limas et al. |
| 10,686,618 | B2 * | 6/2020 | Dizengof .......... H04M 1/72536 |
| 2007/0028279 | A1 | 2/2007 | Kim |
| 2015/0056946 | A1 | 2/2015 | Leggett et al. |
| 2015/0099482 | A1 | 4/2015 | Schmitz |
| 2016/0014585 | A1 | 1/2016 | Sundararaj et al. |
| 2016/0088455 | A1 | 3/2016 | Bozik et al. |
| 2016/0337831 | A1 * | 11/2016 | Piett ........................ H04W 4/90 |
| 2016/0381091 | A1 * | 12/2016 | O'Connor ........... H04L 65/1089 370/260 |
| 2017/0124853 | A1 | 5/2017 | Mehta et al. |
| 2017/0126751 | A1 | 5/2017 | Stach et al. |
| 2017/0164175 | A1 | 6/2017 | Bozik et al. |
| 2017/0180964 | A1 | 6/2017 | Mehta et al. |
| 2019/0052474 | A1 | 2/2019 | Dizengof |

OTHER PUBLICATIONS

Advisory Action Before the Filing of an Appeal Brief dated Nov. 15, 2019 From the US Patent and Trademark Office Re. U.S. Appl. No. 15/822,927. (6 pages).

Applicant-Initiated Interview Summary dated Dec. 26, 2018 From the US Patent and Trademark Office Re. U.S. Appl. No. 15/822,927. (3 pages).

European Search Report and the Written Opinion dated Dec. 6, 2018 From the European Patent Office Re. Application No. 18188748.0. (10 Pages).

Interview Summary dated Apr. 10, 2020 from the US Patent and Trademark Office Re. U.S. Appl. No. 15/822,927. (3 pages).

Notice of Allowance dated Apr. 22, 2020 from the US Patent and Trademark Office Re. U.S. Appl. No. 15/822,927. (6 pages).

Official Action dated Jan. 3, 2020 From the US Patent and Trademark Office Re. U.S. Appl. No. 15/822,927. (16 pages).

Official Action dated Apr. 5, 2019 From the US Patent and Trademark Office Re. U.S. Appl. No. 15/822,927. (20 pages).

Official Action dated Aug. 6, 2019 From the US Patent and Trademark Office Re. U.S. Appl. No. 15/822,927. (18 pages).

Official Action dated Nov. 9, 2018 From the US Patent and Trademark Office Re. U.S. Appl. No. 15/822,927. (16 pages).

Official Action dated Jun. 14, 2018 From the US Patent and Trademark Office Re. U.S. Appl. No. 15/822,927. (14 pages).

Invitation pursuant to Rule 137(4) EPC and Article 94(3) EPC dated Oct. 30, 2020 From the European Patent Office Re. Application No. 18188748.0. (3 Pages).

Communication Pursuant to Article 94(3) EPC dated Feb. 12, 2021 From the European Patent Office Re. Application No. 18188748.0. (9 Pages).

* cited by examiner

METHOD FOR STREAMING REAL-TIME DATA FROM A USER DEVICE TO A DISPATCH UNIT TERMINAL

RELATED APPLICATIONS

This application is a continuation of U.S. patent application Ser. No. 15/822,927 filed on Nov. 27, 2017, which claims the benefit of U.S. Provisional Application No. 62/544,835 filed on Aug. 13, 2017. The contents of the above applications are all incorporated by reference as if fully set forth herein in their entirety.

TECHNICAL FIELD

The present disclosure relates generally to streaming of data, and more specifically, to a method and system of streaming data from a user device without the need to download and install a specialized application.

BACKGROUND

Many mobile devices on the market today, including smartphones, tablets, notebook computers, and the like, come equipped with built-in media capturing components, including still cameras, video cameras, microphones, global positioning receivers, and the like. These components are used by millions of users to share photos and videos, use the internet for video chats, navigate roads with ease, along with a multitude of other uses.

However, when a person calls an emergency or municipal dispatch unit to report an incident from a mobile device, these media capturing capabilities are rarely used. Rather, an operator of a call center, such as a public-safety answering point (PSAP), receives the incoming calls, asks the caller several questions to assess the nature of the incident, and then delivers the call to a suitable dispatch unit, such as police, firefighting, ambulance services, and the like.

In many cases the calls received at these call centers are critical and every additional detail that can be retrieved from the call may help the dispatch operator better understand the situation in the field, and explain to the dispatched forces the situation before they arrive on-scene so they can be better prepared.

Some communication applications allow the device to connected to a dispatch unit system, by which audio, video, messages, and the like can be transmitted to the call center system. Thus, the dispatch operator is able to hear the user, see video captured in real time by the user's device, e.g., a smart phone or tablet, send and receive text messages, identify the communication device location, and the like.

However, these proposed systems require a user to download and install specialized applications, which may take time, losing precious moments of data. Further, in many emergency situations involving large numbers of individuals, available bandwidth of cellular networks become limited, as many devices attempt to connect the cellular networks at the same time. As such, communication and access to download applications over a cellular network may become unfeasible. Additionally, individuals experiencing a stressful emergency situation may be unfocused and unable to operate a previously installed application, let alone download and set up a new application on their devices.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for streaming real-time data from a user device to a dispatch unit terminal, where the method includes: identifying a connection between a user device and a call center; sending a link to the user device, wherein the link includes instructions to initiate streaming of real-time data from the user device, and further includes a unique identifier associated with the user device; and sending the real-time data to a dispatch unit terminal, where the unique identifier is used to match the real-time data with the dispatch terminal used in the connection.

Certain embodiments disclosed herein also include a non-transitory computer readable medium having stored thereon instructions for causing a processing circuitry to perform a process, the process comprising: identifying a connection between a user device and a call center; sending a link to the user device, wherein the link comprises instructions to initiate streaming of real-time data from the user device, and further comprises a unique identifier associated with the user device; sending the real-time data to a dispatch unit terminal, wherein the unique identifier is used to match the real-time data with the dispatch terminal used in the connection.

Certain embodiments disclosed herein also include system for streaming real-time data from a user device to a dispatch unit terminal, comprising: a processing circuitry; and a memory, the memory containing instructions that, when executed by the processing circuitry, configure the system to: identify a connection between a user device and a call center; send a link to the user device, wherein the link comprises instructions to initiate streaming of real-time data from the user device, and further comprises a unique identifier associated with the user device; send the real-time data to a dispatch unit terminal, wherein the unique identifier is used to match the real-time data with the dispatch terminal used in the connection.

BRIEF DESCRIPTION OF THE SEVERAL VIEWS OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
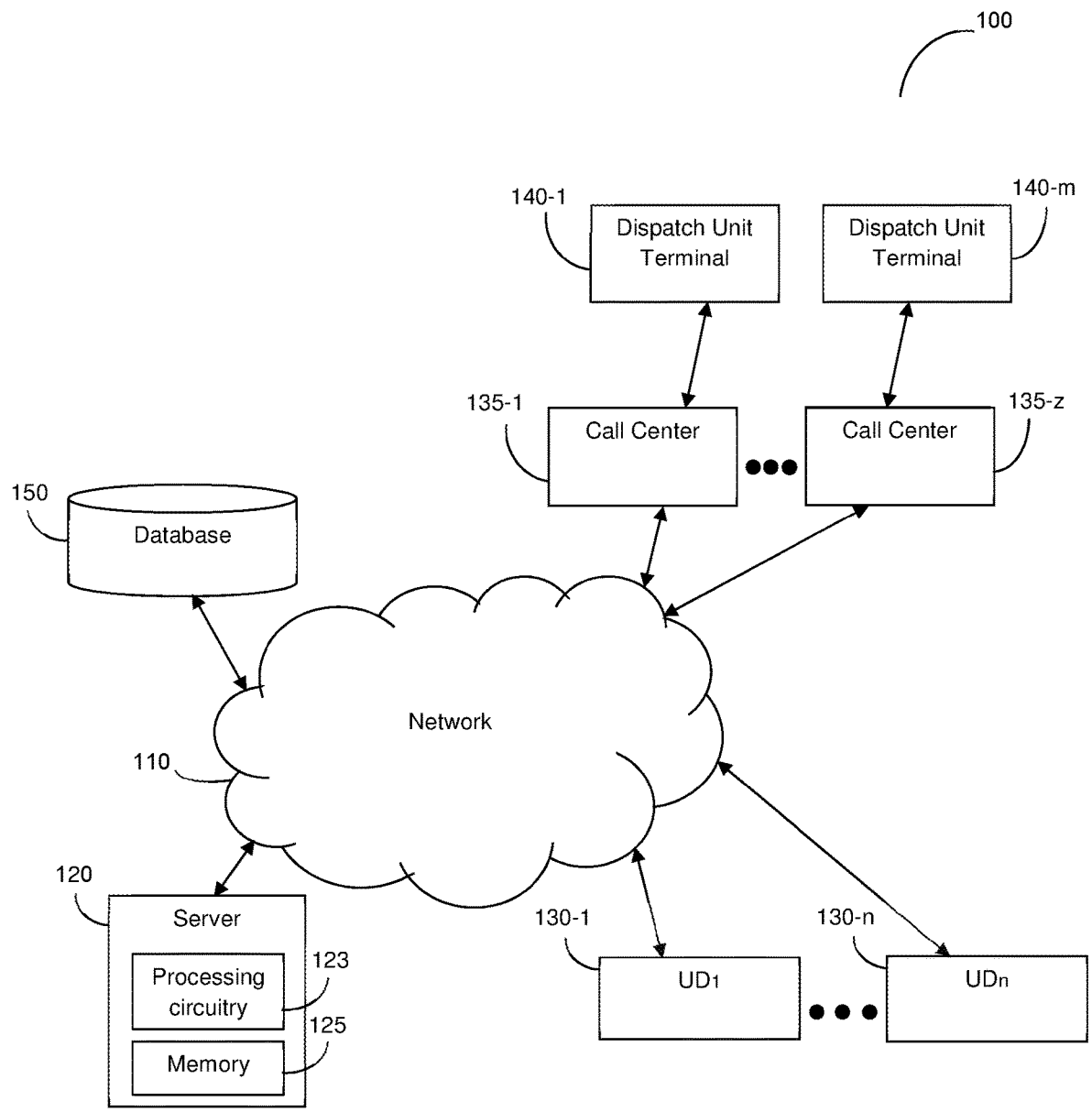
FIG. 1 is a network diagram of the system for streaming real-time data according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, some disclosed embodiments include a method and system for streaming real-time data from a user device to a call center. The method includes identifying a first connection between a user device and a call center, such as a public-safety answering point (PSAP) for reporting on an emergency or non-emergency incident. The reporting may be a call initiated between the call center and use device. Both the user device and the call center are identified, and a link, such as a uniform resource locator (URL), that includes an identifier unique to the user device is sent to the user device. Upon identification that the link was engaged, the user device is configured to initiate the uploading of streaming real-time data from the user device to the call center. In an embodiment, the uploaded real-time data is associated with the user device using the identifier. The uploading of data may be accomplished by a preinstalled application, or an instant application, on the user device, as explained herein. The real-time data may be forwarded to a first dispatch unit terminal (DUT). According to optional embodiment, the first DUT receives the real-time data and associates the received data with at least an audio content received over the first connection.

FIG. 1 shows an exemplary diagram of a networked system 100 utilized to describe the various disclosed embodiments. The system 100 includes a network 110 which enables communication between the different elements of the system 100 that are connected to the network 110. The network 110 may include a cellular network, such as a third or fourth generation cellular network, e.g., the Global System for Mobile Communications (GSM) network, the Enhanced Data rates for GSM Evolution (EDGE) network, the Universal Mobile Telecommunications Service (UMTS) network, the Long-Term Evolution (LTE) network, LTE Advanced network, and the like.

The system 100 further includes a server 120 that is connected to the network 110. The server 120 contains a hardware and a software component configured to execute predetermined computing tasks, and includes a processing circuitry 123 and a memory 125. The processing circuitry 123 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 125 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed, cause the processing circuitry 123 to perform the various processes described herein.

One or more user devices (UD) 130, are connected to the network 110, i.e., UD 130-1 through 130-n, where 'n' is an integer equal to or greater than 1. The UD 130 may be, for example, a smartphone, a mobile phone, a laptop, a tablet computer, a wearable computing device, and the like. The UD 130 may be configured to collect and upload data and real-time data captured by the UD 130, including, but not limited to, audio data, video data, location data and the like. Additionally, the UD 130 may connect to the network 110 using voice calls as well as voice over internet protocol (VOIP).

Also connected to the network 110 are one or more call centers 135, i.e. call center 135-1 through call center 135-z where 'z' is an integer equal to or greater than 1. A call center 135 may be, for example, a public-safety answering point (PSAP) that is configured to receive calls made by citizens regarding emergency or non-emergency situations. The PSAP routes the calls to a suitable dispatch unit, such as a dispatch unit terminal (DUT) 140 associated with a particular type of incident.

A DUT 140, i.e. DUT 140-1 through DUT 140-m (where 'm' is an integer equal to or greater than 1), is an electronic end-point device for receiving emergency and non-emergency calls, live streaming data, data related to the UD 130, and the like. For example, the call center 135 may forward a call to a fire department's DUT for a call regarding a fire, or a police's DUT for a call regarding a criminal act. The DUTs 140 may be connected to the network 110 directly, or via the call center 134.

The system 100 further includes a database 150 connected to the network 110. Alternatively, the database 150 may be connected directly to the server 120 (not shown). The database 150 may be a data warehouse, a cloud database, and the like, designed to store therein data sent by, for example, the UD 130. The database may further be configured to be accessed by various other components of the system 100, including the call center 135 and the DUT 140.

According to an embodiment, the server 120 is configured to detect an establishment or an attempted establishment of a first connection between a UD 130 and a call center 135. The first connection may be, for example, a voice call over a cellular network, such as a when a phone call is established between the user device and a call center. For example, the UD 130 may be used to call an emergency response number, e.g., 9-1-1, via a cellular network. When the call is received at a call center 135, a first connection is established. An attempt to establish a connection is determined when a call from a UD 130 is queued. In an additional embodiment, the call is forwarded to a suitable DUT 140, and the server is configured to detect when a first connection is established between a UD 130 and a DUT 140, e.g., after the call center 135 routes a call from a UD 130 to an appropriate DUT 140.

In an embodiment, the server 120 is configured to detect the establishment or an attempted establishment of a first connection through an application programming interface (API) of a private branch exchange (PBX) of the call center 135. Through the API, the server 120 can search for an established (or queued) connection, and identify UDs 130 connected to a call center 135. The identification of a UD 130 may be based on its phone number or other unique parameters associated with the UD 130.

Upon identification of the UD 130 and the call center 135 and/or the DUT 140, the server 120 is configured to send an electronic message to the UD 130 over a second connection over the network 110. The second connection is directly established between the server 120 and a UD 130 over the network 110. The electronic message may be, for example, a short message service (SMS), an MMS, an electronic mail (email) message, and the like. The electronic message includes at least a link that includes an identifier unique to the UD 130. The identifier may be, for example, a code snippet, a randomly generated string, a signature, and so on. Each identifier is uniquely generated for each UD 130 and therefore distinguishes any data sent from different UDs. The link may be, for example, a URL where the unique identifier may be the suffix of the URL, referencing a web address of the call center connected to the UD.

When the link has been engaged on the UD 130, e.g., selected, tapped, or clicked on, the server 120 is configured to launch an application on the UD 130. In an embodiment, the application is a web browser, where the web browser includes an interface for uploading and/or streaming data. In this particular embodiment, the web browser is utilized to upload or stream real-time data collected by the UD 130.

In another embodiment, the link sent to the UD 130 is configured to launch an instant application. Instant applications, such as Google® Android Instant Apps, allow users to run applications instantly, without requiring a user to download and install a full application file. The instant application enables the UD 130 to rapidly open a designated application, such as an emergency application, and start uploading and/or streaming real-time data to the call center 135 (referenced in the link) without requiring any specialized application to be installed on the UD 130 beforehand. For example, when the link is engaged, only the necessary parts of an application's code are downloaded that enable the UD 130 to rapidly stream real-time data. By using an instant application, significant and often critical time is saved, as an instant application can be downloaded and launched more quickly than a full application, thus allowing a UD 130 to begin streaming the real-time data quickly.

Real-time data may include video, audio, and images captured by the UD 130, text messages, chats, location data and the like. In another embodiment, the real-time data further includes GPS coordinates and/or indoor coordinates. The GPS coordinates may be provided by a GPS receiver installed in the UD 130. The indoor coordinates may be determined using Wi-Fi signals or other RF signals. In an embodiment, a request for using at least one media-capturing component of the UD 130 is included in the link. For example, the link may initiate the real-time streaming of just audio data, or just video data, to the call center 135.

According to an embodiment, streaming the real-time data is achieved using a Web Real-Time Communication (WebRTC) API that enables real-time communication over peer-to-peer connections. When initiating the web browser on the UD 130 to stream data to the call center 135 and/or to the DUT 140, the server 120 may cause the UD 130 to establish a WebRTC session using a WebRTC API that would allow streaming real-time data from the UD 130 to the call center 135 and/or the DUT 140. WebRTC protocol typically includes the ability to connect two devices without requiring an intermediate server, thereby allowing for data to stream directly without requiring an intermediate server.

According to another embodiment, some or all portions of the streaming data, such as the location of the UD 130, audio data, and the like, may be sent using other communication protocols, such as hypertext transfer protocol (HTTP), Web-Socket, and so on.

In some embodiments, the real-time data is streamed from the UD 130 to a server, such as the server 120, in order to first convert the real-time data collected by the UD 130 into a format more suitable for streaming on a DUT 140. The conversion allows the end point devices of the call center 135 to receive, identify and use the real-time data sent initially from the UD 130 through the server 120. The server 120 is configured to send the converted real-time data to the call center 135 or directly to the DUT 140.

Any real-time data streamed or otherwise uploaded to the call center 135 is coupled with the unique identifier included in the link. In an embodiment where the real-time data is streamed to the call center 135, after the call center 135, e.g. a PSAP, receives the real-time data with the identifier, the call center 135 routes the received real-time data to a DUT 140 to which the UD 130 was connected to through the first connection.

According to an embodiment, the real-time data is associated, at the first DUT 140, with at least an audio content that was received over the first connection. That is, when the real-time data is sent to the first DUT 140, the identifier that was included within the link is utilized for associating the real-time data with the at least audio content at the first DUT 140. In an alternative embodiment, the real-time data is sent from the UD 130 directly to the DUT 140 that it was connected to over the first connection.

Figure 2:
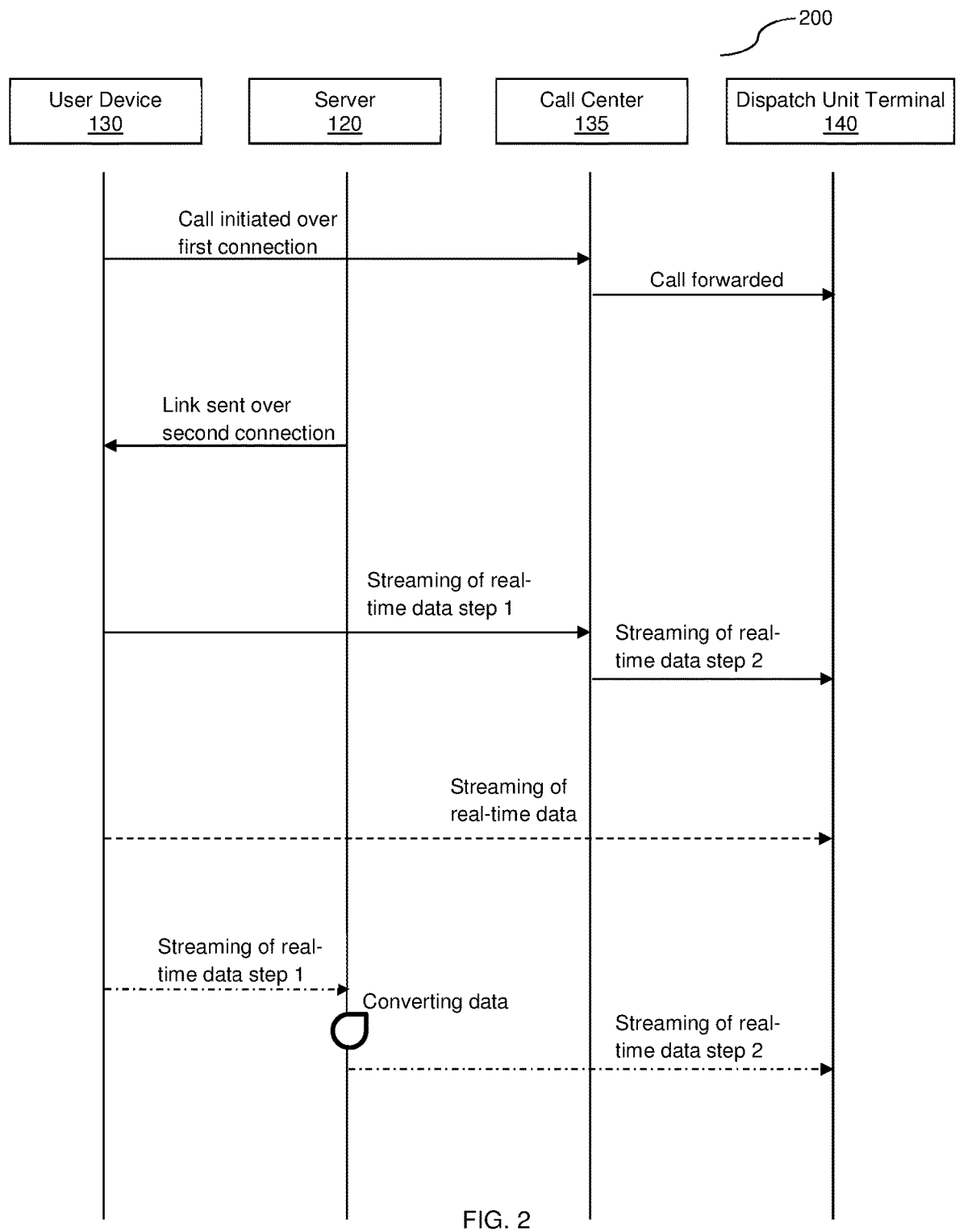
FIG. 2 is a sequence diagram illustrating the method according to an embodiment.

FIG. 2 is a sequence diagram illustrating the method 200 according to an embodiment. As a non-limiting example, a call is initiated from a user device 130, e.g., a user dials 9-1-1 to report a robbery, and is first connected to a call center 135. The call is then forwarded to an appropriate DUT 140. When the call is answered, or while still in queue, by the DUT 140, the server 120 identifies the UD 130 and sends a link over a second connection, such as an SMS, to the UD 130. When the user engages the link, a web browser is launched, enabling the streaming of real-time data, such as video, audio, location data, and the like, from the UD 130 to the call center 135. The call center then forwards the real-time data to the DUT 140.

In an alternate embodiment, the real-time data is sent directly to the DUT 140. In a further embodiment, as further described herein above, the real-time data may be initially converted by the server 120 or a different proxy server (not shown) that is configured to convert the data from the UD 130 into a format that is optimized for the DUT 140 to review and analyze the data. After the conversion, the data is sent to the DUT 140.

In an embodiment, the server 120 is further configured to launch an application on the DUT 140 that is designed to display the streamed real-time date from the UD 130. The application may be, for example, a video player through which the real-time data is displayed and may enable a dispatch operator operating the DUT 140 to have a better perspective of the circumstances where the UD 130 is located.

According to another embodiment, the server 120 may be configured to use the identification of the UD 130, using for example, the phone number of the UD 130, to extract information associated with the user of the UD 130. The information may be related to, for example, the user's name, sensitivities to certain medications, blood type, disabilities, and so on. The information may be extracted from at least one source, such as the database 150, a web source, and the like, and sent to the DUT 140 together with the real-time data, such that the dispatch operator of the DUT 140 may be able to receive the additional information related to the user.

According to another embodiment, the system 100 may be used by one user to assist another user. For example, a first user associated with a first UD 130-1 may contact the call center 135 to report that a second user associated with a second UD 130-2 requires assistance. The first UD 130-1 may provide an identifier for the second UD 130-2, such as a phone number. The identifier of the second UD 130-2 may be received by the server 120, where the server 120 is configured to send a link to the second UD 130-2 over a second connection to initiate streaming of real-time data from the second UD 130-2.

According to yet a further embodiment, the system 100 may be utilized for reestablishing a connection between a UD 130 and the call center 135, or a specific DUT 140, upon identification that the connection was lost. For example, a first connection between a first UD 130-1 and a call center 135 is identified, and after a while the connection is lost. The server 120 uses the identifier, i.e. the phone number, associated with the first UD 130-1, for reestablishing the first connection with the first UD 130-1, and sends, over a second connection, a link to the first UD 130-1 in order to initiate streaming of real-time data from the first UD 130-1.

Figure 3:
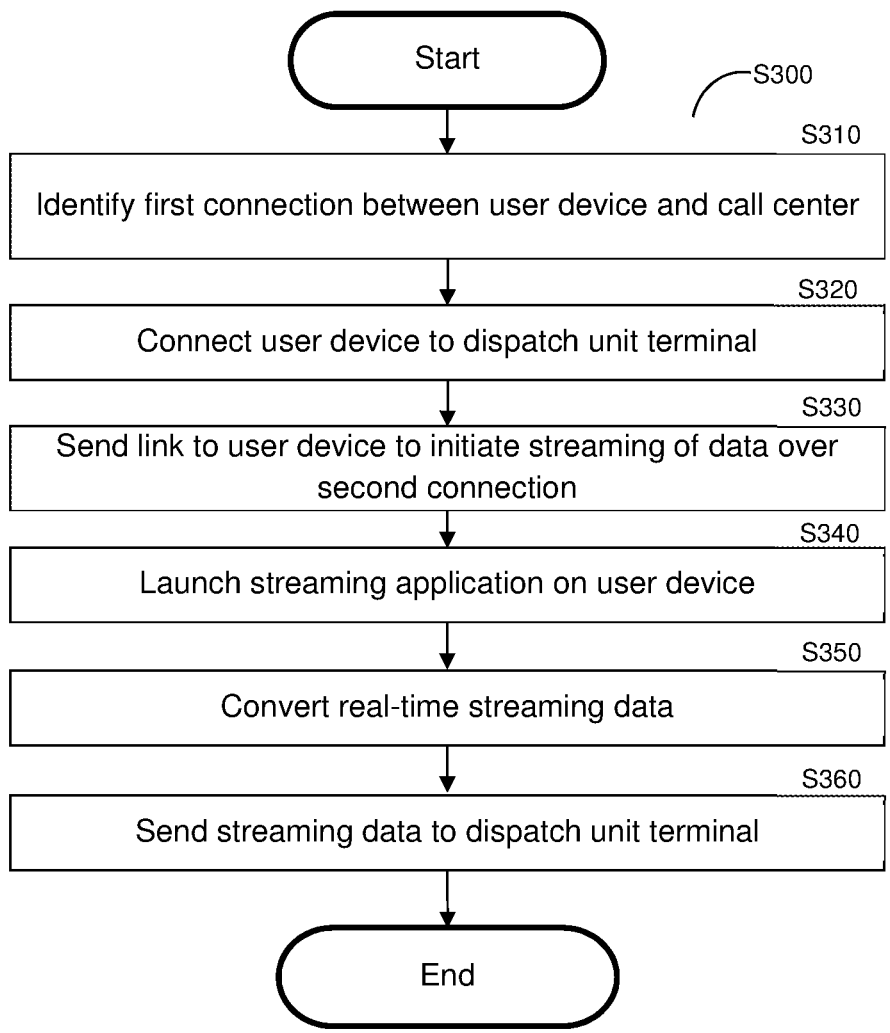
FIG. 3 is a flowchart of the method used by the system for streaming real-time data according to an embodiment.

FIG. 3 is a flowchart of the method 300 used by the system for streaming real-time data according to an embodiment. At S310, the operation starts by identifying the establishment of a first connection between a user device and a call center. The first connection may pass over a network, such as a cellular or mobile network. For example, the first connection may include a voice call or a VOIP call from a user device, such as a smartphone, to a call center, such as a PSAP. The call center determines what the nature of the call is, such as reporting a fire, a crime, a medical emergency, and the like.

At S320, the user device is further connected to a dispatch unit terminal that is suitable for the situation. For example, the dispatch unit terminal would be connected to a fire station if the scenario involves a fire, and a police station if the scenario involves a crime. Further, the user device is identified. The identification may be achieved by identifying a phone number or other unique identifier associated with the user device.

At S330, based on the identification of the user device, and the specific dispatch unit terminal to which it has been connected over the first connection, a link is sent to the user device over a second connection as further described herein above with respect of FIGS. 1 and 2. The link includes an identifier unique to the UD 130, and an instruction set to begin streaming data from the user device.

At S340, based on determination of whether the link was engaged on the user device, e.g., tapped, selected, clicked on, and the like, an application is launched that includes an interface for streaming real-time data collected by the user device. The collection of data may include video or images from a camera, audio from a microphone, location data from a global positioning system, movement from an accelerometer, detected radio frequency signals, and the like. The real-time data is further associated with the user device by a unique identifier.

In an embodiment, the application that is launched is a web browser, namely an application primarily designed to display web pages from the internet. As many browser applications have native support for the uploading of real-time data, such as audio recordings, images, video and the like, the browser is capable of initiating and carrying out the streaming of data. Further, as most commonly used user devices, such as smartphones, tablets, personal computers and so on, come pre-installed with a browser application, there is no need to require additional downloading and installation of a specialized application, thus ensuring increased compatibility.

In a further embodiment, the application includes an instant application, which is reduced version of a full application. An instant application can be initiated from within a browser when activated by a link, and involves downloading only portions of the application that are necessary for the desired task. Further, instant applications do not require a traditional installation on a user device. For example, while a full streaming application would require access to an application marketplace, and account associated with that marketplace, and the completion of a full installation, an instant application can be launched automatically, after only downloading a reduced version of the application, without requiring access to or an account associated with an application marketplace.

At optional S350, the real-time data is first forwarded to a server, where it is converted into a format that is optimized to allow for quicker streaming of the user device data to the dispatch unit terminal. A unique identifier is associated with the real-time data, allowing the dispatch unit terminal to associate the data with the user device, even if the streaming is accomplished over a second or third connection.

At S360, the real-time data is uploaded and sent to the dispatch unit. In an embodiment, a peer to peer connection is established between the user device and the call center, where the real-time data is further forwarded to the dispatch unit terminal. In another embodiment, a direct peer to peer connection is established between the user device and the dispatch unit terminal, where the real-time data is directly uploaded without an intermediary step.

The streaming real-time data may be transmitted to the dispatch unit terminal using the WebRTC (Web Real-Time Communication) protocol, which allows for real-time communication and transfer of audio, video, and other data directly from within a browser, without requiring the installation of a separate application. WebRTC can be used with many widely used browsers, both in mobile format (e.g., on a smartphone or a tablet), and desktop format (e.g., on a desktop or laptop computer). WebRTC employs APIs that can be executed over multiple platforms, e.g., over Windows®, Android®, iOS® and Linux® without requiring rewriting any of the code. Thus, a link to run browser for streaming real-time data can be executed over a variety of platforms without having to tailor the streaming procedure by individual device. This ensures expanded compatibility allowing for many user devices to successfully stream data.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processing circuitry is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for streaming real-time video data from a user mobile device to an Emergency Call Center (ECC) dispatch unit terminal, comprising:
   at a user mobile device:
      initiating an emergency call with the ECC dispatch unit terminal, by dialing to an Emergency Call Center (ECC), said emergency call is conducted through a first communication connection to allow said ECC to detect said emergency call through an application programming interface (API) of said ECC executed by a server;
      receiving, through a second communication connection, a link generated in response to the detection of said emergency call and transmitted to said user mobile device from at least one processing unit which sends said link, wherein said link is made available to be engaged by a user of said user mobile device, following an identification of said user mobile device, wherein the link comprises a unique identifier associated with said user mobile device and instructions to initiate streaming of real-time video data from the user mobile device via a web browser executed on the user mobile device, said web browser allowing said user to stream said real-time video data without downloading and installing a full application on said user mobile device;
      upon identification of an activation of said link by said user, launching, on said user mobile device, said web browser having a WebRTC (Web Real-Time Communication) interface configured to initiate said streaming of said real-time video data from the user mobile device by establishing a WebRTC session for streaming said real-time video data; and
      sending the real-time video data through said WebRTC session, the real-time video data is sent for presentation by the ECC dispatch unit terminal,
      wherein the ECC dispatch unit terminal associates the real-time video data and the user mobile device based on said unique identifier.

2. The method of claim 1, wherein said streaming of the real-time video data also includes at least one of: audio, images, chats, location data, and motion data.

3. The method of claim 1, wherein the unique identifier is a phone number associated with the user mobile device.

4. The method of claim 1, wherein said dispatch unit terminal is determined by said call center based on a scenario identified from said call.

5. A non-transitory computer readable medium having stored thereon instructions for causing a processing circuitry to perform the method of claim 1.

6. The method of claim 1, wherein said link is a Uniform Resource Locator (URL).

7. The method of claim 6, wherein the unique identifier is included as a suffix of the URL, referencing a web address of the ECC connected to the user mobile device.

8. The method of claim 1, wherein said detection of said emergency call is conducted by said server by conducting a search through said API identifying said first communication channel connecting said mobile device to said ECC.

9. The method of claim 8, wherein said identifying by said server is achieved based on at least one of a phone number of said mobile device initiating the emergency call, and a unique parameter associated with the mobile device initiating said emergency call.

10. The method of claim 1, wherein said link is generated following an identification of the user mobile device and at least one of said ECC and said dispatch unit terminal.

11. The method of claim 1, wherein said API is an API of a private branch exchange (PBX) of the ECC.

12. A system for streaming real-time video data from a user mobile device to an Emergency Call Center (ECC) dispatch unit terminal, comprising:
   a processing circuitry; and
   a memory, the memory containing computer instructions that, when executed by the processing circuitry, configure the system to:
      detect through an application programming interface (API) of an Emergency Call Center (ECC) and executed by a server, an initiation of an emergency call initiated by a user dialing through a user mobile device to said ECC through a first communication connection;
      sending a link to the user mobile device through a second communication connection, following an identification of said user mobile device, said link is made available to be engaged by a user of said user mobile device, wherein the link comprises a unique identifier associated with said user mobile device, identified by said detection, and instructions to initiate streaming of real-time video data from the user mobile device via a web browser executed on the user mobile device, wherein said web browser allowing said user to stream said real-time video data without downloading and installing a full application on said user mobile device;
      receiving real-time video data from said mobile device through a WebRTC (Web Real-Time Communication) session established by said mobile device, configured to initiate said streaming of said real-time video data from the user mobile device, by establishing said WebRTC session for streaming said real-time video data, the web browser is launched upon activation of said link by said user of said user mobile device; and sending the real-time video data to the dispatch unit terminal used by said ECC in the first communication connection, the real-time video data is sent for presentation by the dispatch unit terminal;

wherein the ECC dispatch unit terminal associates the real-time video data and the user mobile device based on said unique identifier; and wherein the real-time video data is sent according to said instructions, upon identification of said activation of said link by said user of said user mobile device.

13. The system of claim 12, wherein said streaming of the real-time video data also includes at least one of: audio, images, chats, location data, and motion data.

14. The system of claim 12, wherein the unique identifier is a phone number associated with the user mobile device.

15. The system of claim 12, wherein said dispatch unit terminal is determined by said ECC based on a scenario identified from said call.

16. The system of claim 12, wherein said link is a Uniform Resource Locator (URL).

17. A method for streaming real-time video data from a user mobile device to an Emergency Call Center (ECC) dispatch unit terminal, comprising:

at a processing unit:

detecting through an application programming interface (API) of an Emergency Call Center (ECC) executed by a server, an initiation of an emergency call initiated by a user dialing through a user mobile device to said ECC through a first communication connection;

sending a link to said user mobile device, following an identification of said user mobile device, through a second communication connection, said link is made available to be engaged by a user of said user mobile device;

wherein the link comprises instructions to initiate streaming of real-time video data from the user mobile device via a web browser executed on the user mobile device, and a unique identifier associated with the user mobile device; and wherein said web browser allowing said user to stream said real-time video data without downloading and installing a full application on said user mobile device;

receiving streamed real-time video data from said user mobile device through a WebRTC (Web Real-Time Communication) session; and sending said streamed real-time video data to a dispatch unit terminal of said dispatch unit;

wherein the dispatch unit terminal associates the real-time video data and the user mobile device based on said unique identifier;

wherein activation of said link by said user, causes said user mobile device to launch said web browser which has a WebRTC interface configured to initiate said streaming of said real-time video data from the user mobile device by establishing said WebRTC session for streaming said real-time video data; and wherein said real-time video data is sent according to said instructions, upon identification of said activation of said link by said user of said user mobile device.

18. The method of claim 17, wherein said streaming of the real-time video data also includes at least one of: audio, images, chats, location data, and motion data.

19. The method of claim 17, wherein the unique identifier is a phone number associated with the user mobile device.

20. The method of claim 17, wherein said dispatch unit terminal is determined by said ECC based on a scenario identified from said call.

21. The method of claim 17, wherein said link is a Uniform Resource Locator (URL).

* * * * *